US008867137B2

(12) United States Patent
Shimada et al.

(10) Patent No.: US 8,867,137 B2
(45) Date of Patent: Oct. 21, 2014

(54) HEAD-UP DISPLAY DEVICE (71) Applicant: Yazaki Corporation, Tokyo (JP)

(72) Inventors: Takahiro Shimada, Shimada (JP); Junichi Sasaki, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/713,563

(22) Filed: Dec. 13, 2012

(65) Prior Publication Data
US 2013/0155520 A1 Jun. 20, 2013

(30) Foreign Application Priority Data

Dec. 15, 2011 (JP) ................................ 2011-274716

(51) Int. Cl.
G02B 27/14 (2006.01)
G03H 1/00 (2006.01)
H04N 7/00 (2011.01)
G02F 1/1335 (2006.01)
G02B 27/01 (2006.01)

(52) U.S. Cl.
CPC ............ *G02B 27/01* (2013.01); *G02B 27/0149* (2013.01)
USPC ................ 359/630; 359/13; 348/115; 349/11

(58) Field of Classification Search
USPC ................ 359/409–410, 462, 466, 638–639, 359/13–14, 603–636, 404, 407; 348/115; 345/7, 9, 156; 353/11–12, 28, 119; 349/11; 701/1; 310/49 R, 156.32, 310/156.33, 156.34, 156.35, 266–268, 310/156.02; 340/438, 980, 995.1, 815.47, 340/815.74
See application file for complete search history.

(56) References Cited

U.S. PATENT DOCUMENTS

2003/0016451 A1* 1/2003 Aoki et al. ..................... 359/633
2006/0022896 A1* 2/2006 Kumon et al. ..................... 345/7
2006/0028733 A1 2/2006 Aoki et al.

FOREIGN PATENT DOCUMENTS

| CN | 1706697 A | 12/2005 |
|---|---|---|
| JP | 200855940 A | 3/2008 |
| JP | 201015037 A | 1/2010 |
| JP | 2011197292 A | 10/2011 |

OTHER PUBLICATIONS

Chinese Office Action, Application No. 201210548330.5; issued Aug. 26, 2014.

* cited by examiner

*Primary Examiner* — Dawayne A Pinkney
(74) *Attorney, Agent, or Firm* — Sughrue Mion, PLLC (57) ABSTRACT A head-up display device includes an indicator configured to emit a display light, a lower casing to which the indicator is mounted, an upper casing which is mounted to an upper portion of the lower casing, a pair of support portions which are provided on the lower casing and extend toward the upper casing, guide grooves which are formed on the support portions at opposite sides thereof, and a reflective mirror which is inserted and mounted to the lower casing toward a bottom surface of the lower casing while both lateral edges of the reflective mirror are engaged with the guide grooves, to reflect the display light emitted from the indicator and guide the reflected display light to a windshield of a vehicle.

4 Claims, 7 Drawing Sheets

HEAD-UP DISPLAY DEVICE

BACKGROUND

1. Technical Field

The present invention relates to a head-up display device capable of projecting a virtual image on a projection area of a windshield of a vehicle, and allowing the projected virtual image and a foreground of the vehicle to be superimposed and visually recognized through the windshield from an eye point of the vehicle.

2. Background Art

In recent years, with increased and diversified information required by a driver for driving, vehicles such as automobiles or trains employ head-up display devices (HUDs) that display a virtual image of information to be notified the driver of such as information high in the degree of urgency on a windshield of a vehicle, and allow the virtual image and a foreground of the vehicle to be visually recognized through the windshield in a superimposed manner.

Figure 7:
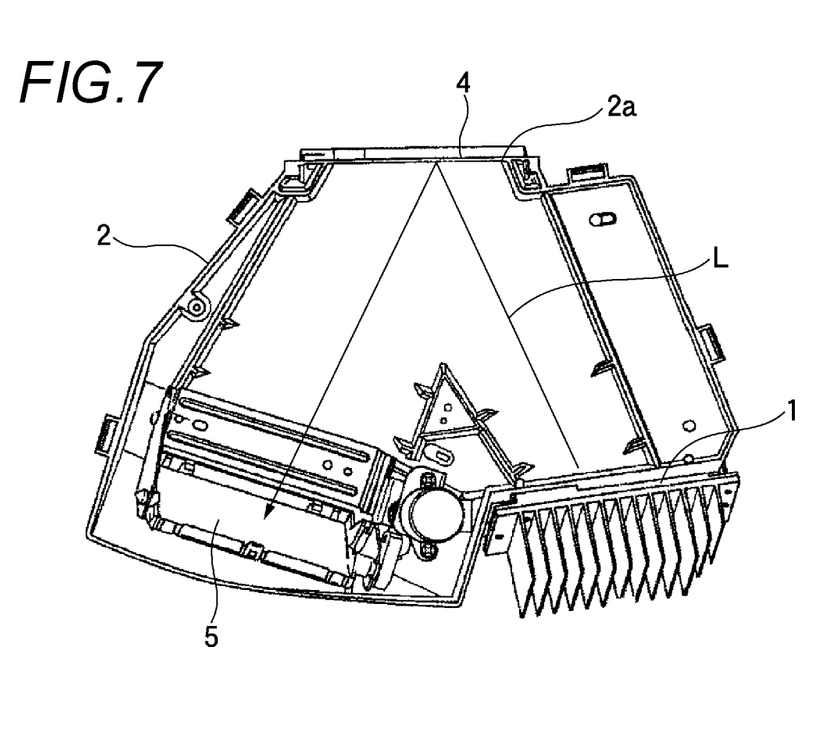
FIG. 7 is a horizontal cross-sectional view of a head-up display device according to the related art.

As illustrated in FIG. 7, a head-up display device includes an indicator 1 for emitting a display light L, a casing 2 onto which the display light L is incident from the indicator 1, reflective plates 4 and 5 received in the casing 2 to reflect the display light L incident in the casing 2 and then guide it to an opening (not illustrated) provided in the casing 2, and a transparent plate (not illustrated) covering the opening 3 (see JP-A-2008-55940 and JP-A-2010-15037).

SUMMARY

The reflective plate 4 is mounted to a window 2a formed on the casing 2 from a lateral direction, and then is adhered thereto by a double-sided tape or the like. In such a mounting method, the mounting workability of the reflective plate 4 is poor, and it is difficult to mount the reflective plate 4 with high accuracy.

The present invention has been made in view of the above circumstances, and an object of the present invention is to provide a head-up display device capable of improving mounting workability of a reflective mirror and mounting the reflective mirror with high accuracy.

A head-up display device according to aspects of the present invention is configured by any one of the following features (1) to (4).

(1) A head-up display device, including:
an indicator configured to emit a display light;
a lower casing to which the indicator is mounted;
an upper casing which is mounted to an upper portion of the lower casing;
a pair of support portions which are provided on the lower casing and extend toward the upper casing;
guide grooves which are formed on the support portions at opposite sides thereof, and
a reflective mirror which is inserted and mounted to the lower casing toward a bottom surface of the lower casing while both lateral edges of the reflective mirror are engaged with the guide grooves, to reflect the display light emitted from the indicator and guide the reflected display light to a windshield of a vehicle.

(2) The head-up display device according to the configuration (1), wherein
the lower casing is provided with a plurality of positioning ribs at a side opposite to the indicator with respect to the reflective mirror to be mounted,
a bezel is overlaid with the reflective mirror at a side of the indicator,
the bezel has a resilient portion for biasing the reflective mirror toward a side opposite to the indicator, and
the reflective mirror is biased by the resilient portion of the bezel, and then is pressed against the positioning ribs, so that the reflective mirror is positioned and restricted in a depth direction.

(3) The head-up display device according to the configuration (2), wherein
the plurality of positioning ribs is provided on a rear plate at a side opposite to the indicator, and
the plurality of positioning ribs includes a reference rib provided at a center portion of the rear plate and a pair of support ribs provided at both sides of the rear plate.

(4) The head-up display device according to the configuration (2), wherein
a bottom surface of the lower casing is provided with a mirror support piece which abuts against a lower edge of the reflective mirror,
the bezel is provided with a push portion which abuts against an upper edge of the reflective mirror, and
the mirror support piece and the push portion abut against the reflective mirror, so that the reflective mirror is positioned and restricted in a height direction to the lower casing.

According to the head-up display device of the configuration (1), as the flat mirror is inserted in the bottom surface of the lower casing in the state in which both lateral edges of the flat mirror are engaged with the guide grooves, the flat mirror can be easily mounted to a given portion of the lower casing. Therefore, the mounting workability of the flat mirror can be remarkably improved. Also, as compared to the mounting structure using a double-sided tape or the like, the flat mirror is directly mounted to the lower casing which becomes a reference of the position when it is positioned and fixed to the vehicle, without using components, so that positioning accuracy can be improved.

According to the head-up display device of the configuration (2) or (3), as the flat mirror is pressed against the positioning ribs (the reference rib and the support ribs) by the resilient portion of the bezel, the flat mirror can be positioned with high accuracy in the depth direction. In this way, it is possible to suppress the displacement in the position of the flat mirror, and thus to suppress a display position of a virtual image, which is reflected from the flat mirror and is illustrated on a windshield of the vehicle, from being displaced.

According to the head-up display device of the configuration (4), the flat mirror can be positioned on the lower casing in a height direction by the mirror support piece of the bottom surface of the lower casing and the push portion of the bezel. In this way, it is possible to suppress the displacement in the position of the flat mirror, and thus to suppress a display position of a virtual image, which is reflected from the flat mirror and is illustrated on a windshield of the vehicle, from being displaced.

The present invention can provide the head-up display device capable of improving the mounting workability of the reflective mirror and mounting the reflective mirror with high accuracy.

As described above, the present invention is briefly explained. A detail of the present invention will be apparent by reading the embodiment for carrying out the invention as explained later with reference to the accompanying drawings.

DETAILED DESCRIPTION

Hereinafter, an embodiment of an embodiment of the present invention will now be described with reference to the accompanying drawings.

In this embodiment, a head-up display device using a VFD (Vacuum Fluorescent Display), such as AMVFD (Active Matrix Vacuum Fluorescent Display), as an indicator will be described herein.

Figure 1:
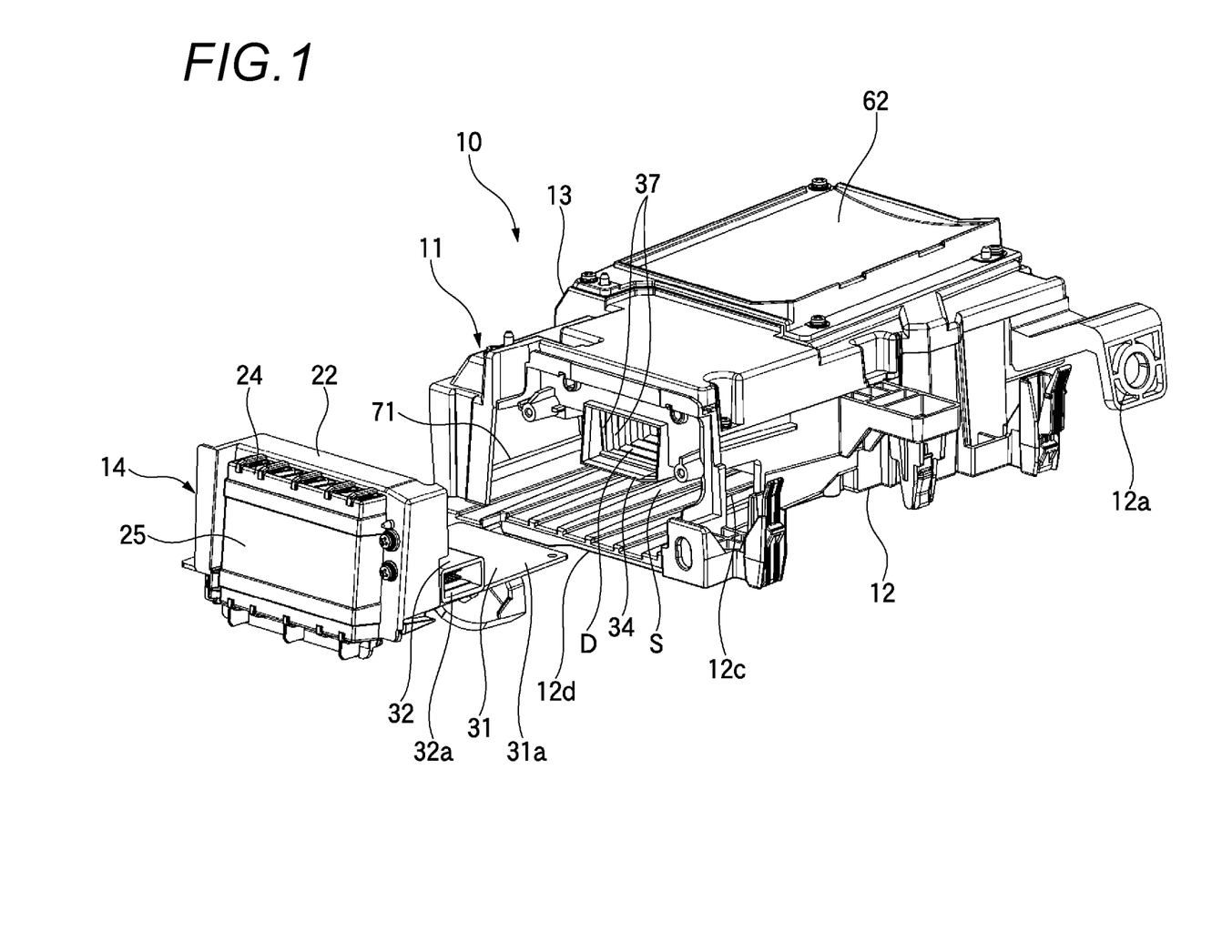
FIG. 1 is a perspective view illustrating a head-up display device according to an embodiment of the present invention, from which an indicator assembly and a wiring substrate are detached.
Figure 2:
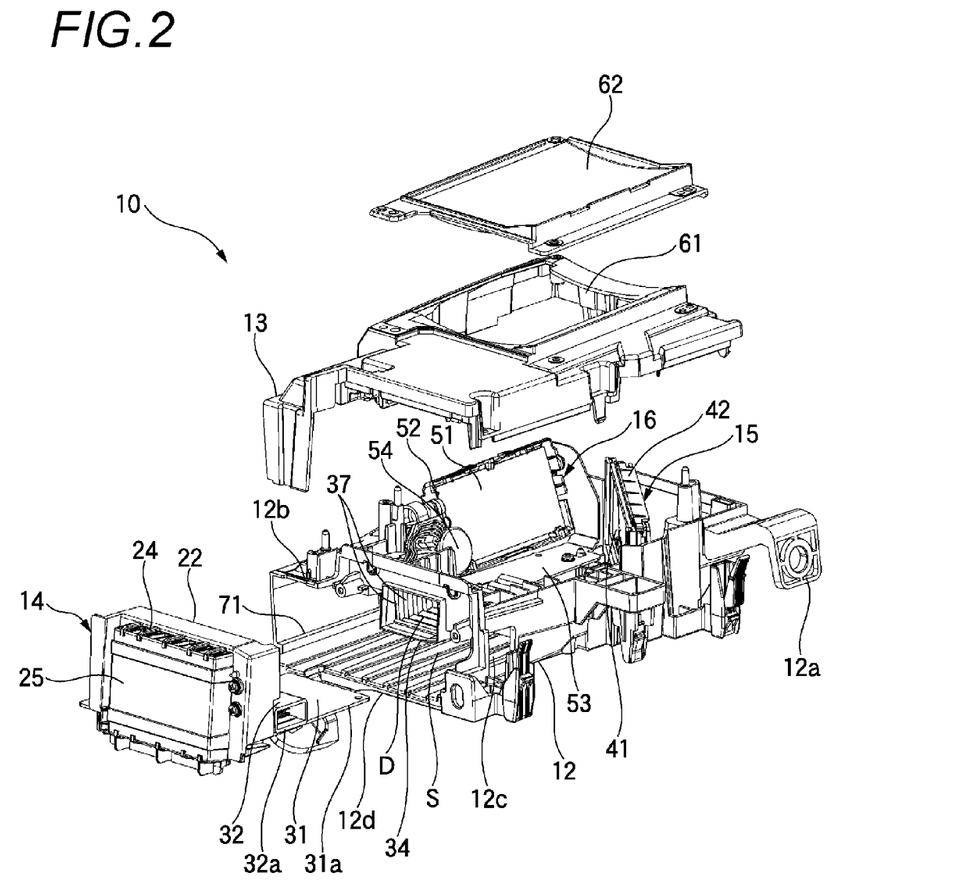
FIG. 2 is an exploded perspective view of the head-up display device according to the embodiment of the present invention.
Figure 3:
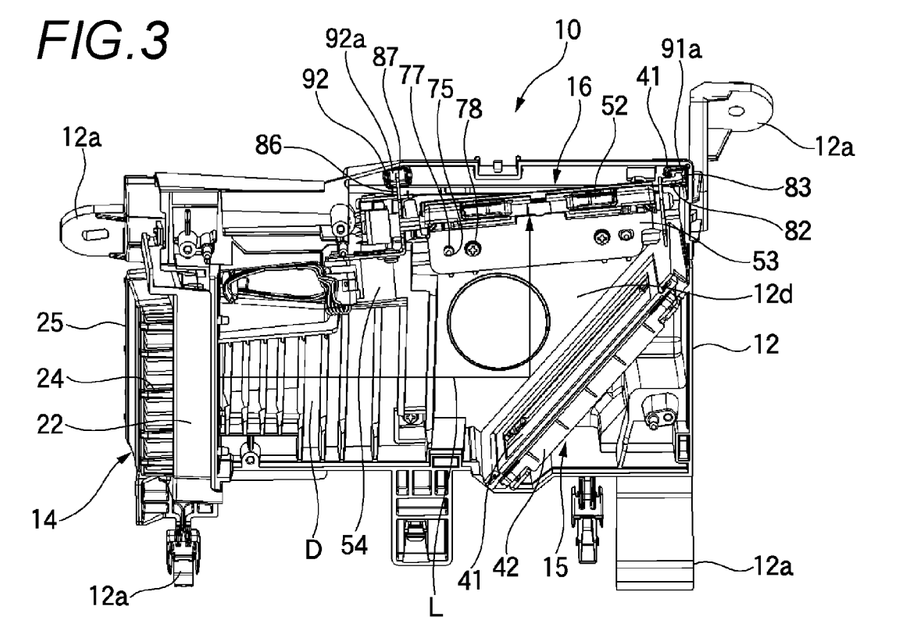
FIG. 3 is a plan view of the head-up display device according to the embodiment of the present invention, from which an upper casing is detached.
Figure 4:
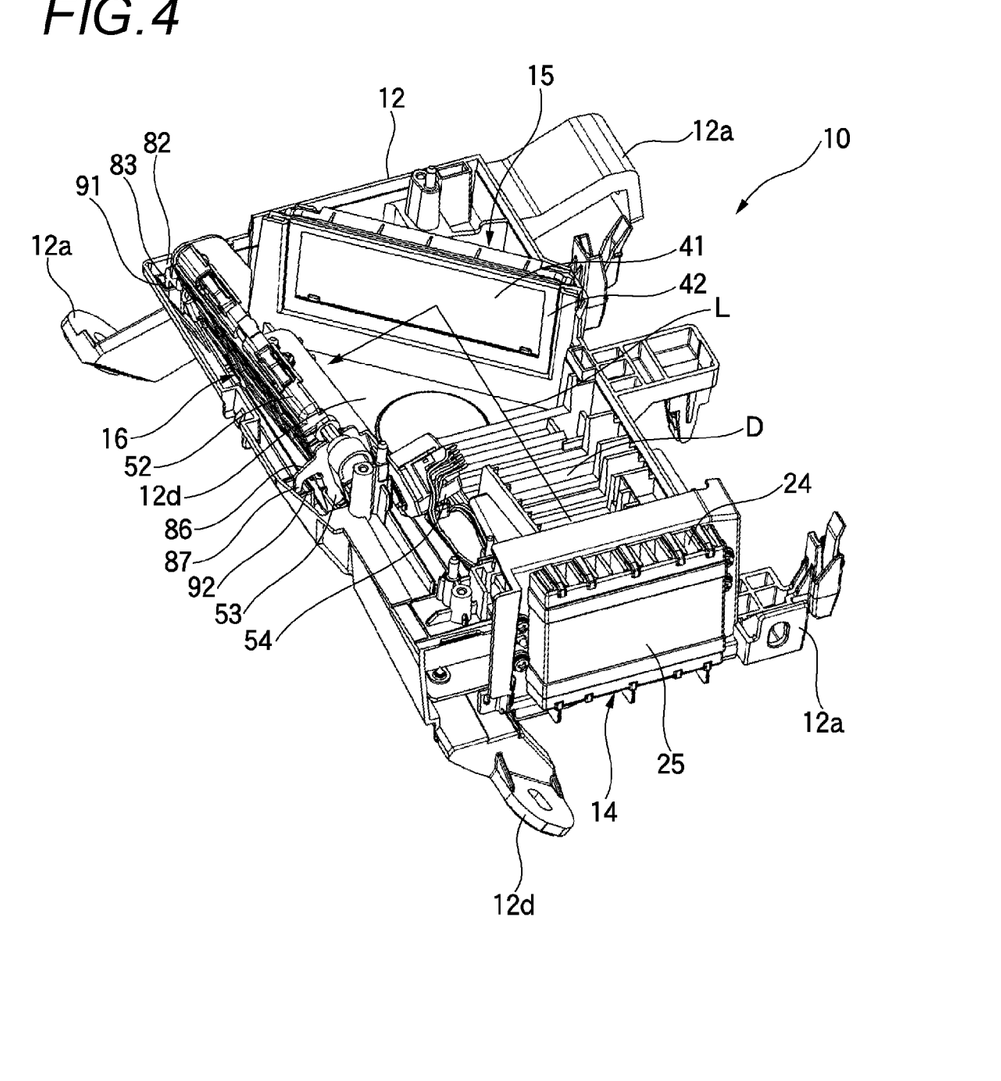
FIG. 4 is a perspective view of the head-up display device according to the embodiment of the present invention, from which the upper casing is detached.
Figure 5:
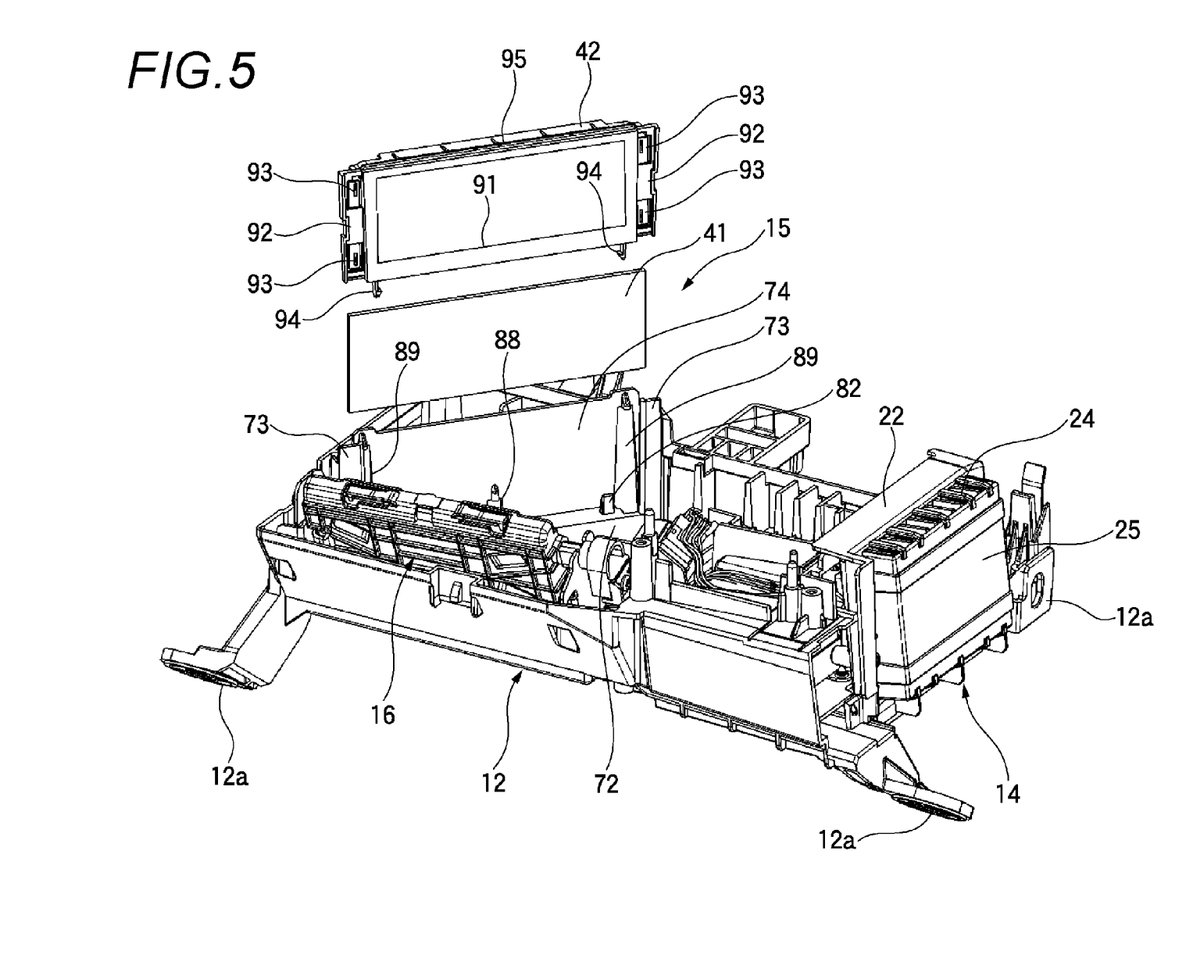
FIG. 5 is an exploded perspective view of a lower casing and a driving mirror assembly.
Figure 6:
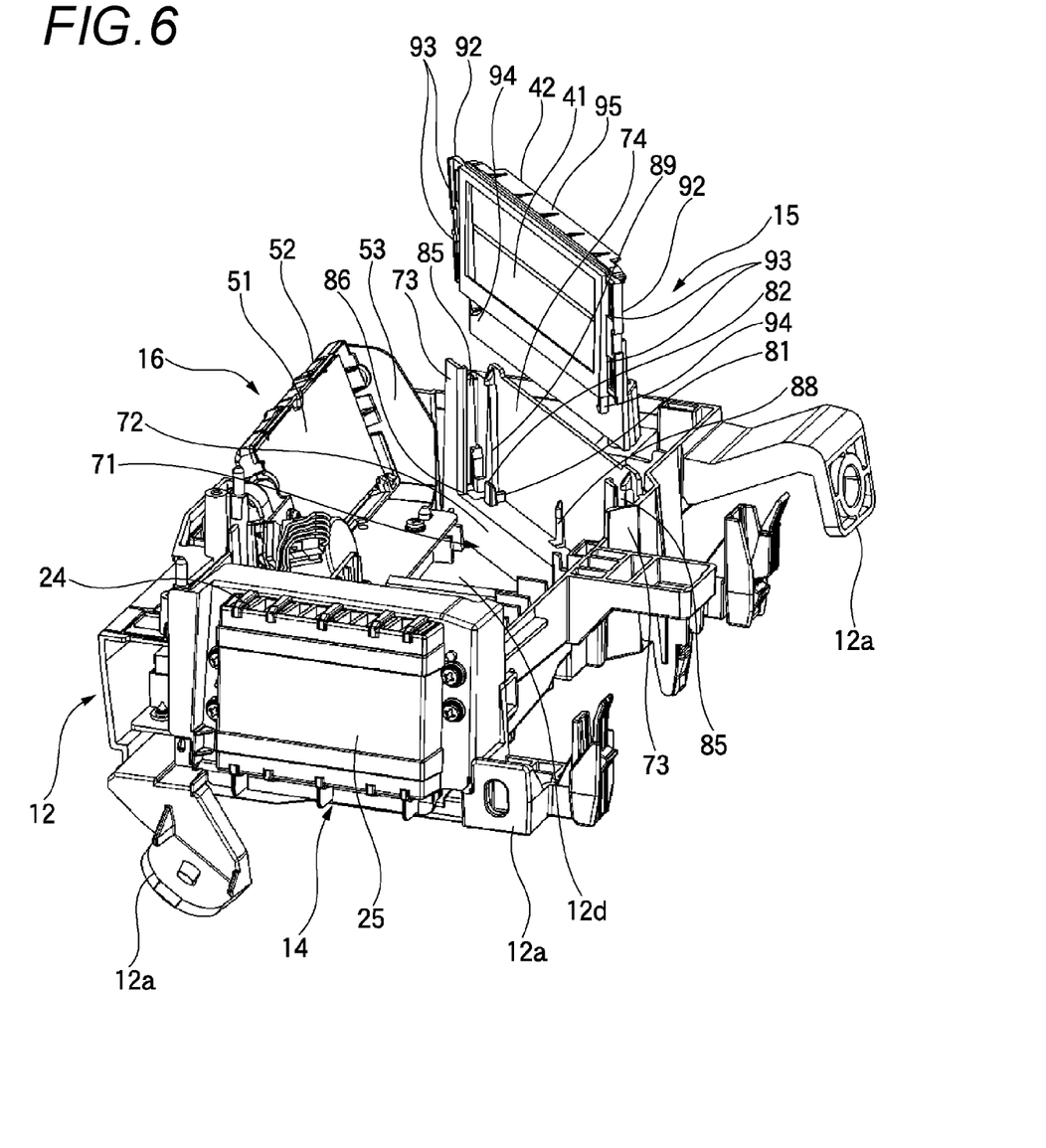
FIG. 6 is an exploded perspective view of the lower casing and the driving mirror assembly.

FIG. 1 is a perspective view illustrating a head-up display device according to an embodiment of the present invention, from which an indicator assembly and a wiring substrate are detached. FIG. 2 is an exploded perspective view of the head-up display device according to the embodiment of the present invention. FIG. 3 is a plan view of the head-up display device according to the embodiment of the present invention, from which an upper casing is detached. FIG. 4 is a perspective view of the head-up display device according to the embodiment of the present invention, from which the upper casing is detached. FIG. 5 is an exploded perspective view of a lower casing and a driving mirror assembly. FIG. 6 is an exploded perspective view of the lower casing and the driving mirror assembly.

As illustrated in FIGS. 1 and 2, a head-up display device 10 includes a casing 11. The casing 11 includes a lower casing 12 and an upper casing 13. The casing 11 is configured by attaching the upper casing 13 to an upper portion of the lower casing 12.

As illustrated in FIGS. 3 and 4, an indicator assembly 14, a flat mirror assembly 15, and a driving mirror assembly 16 are mounted on the lower casing 12.

The indicator assembly 14 is mounted on one end side of the lower casing 12. The flat mirror assembly 15 is mounted on the other end side of the lower casing 12. Also, the drive mirror assembly 16 is mounted on one lateral portion of the lower casing 12.

As illustrated in FIGS. 1 and 2, the indicator assembly 14 has an indicator 22 made of a VFD (Vacuum Fluorescent Display), such as AMVFD, a heat sink 24, and a heat sink cover 25, which are integrated by a fixing means, such as a screw. The indicator assembly 14 irradiates display light L (see FIG. 3) onto a front surface side from the indicator 22. The irradiating path of the display light L emitted from the indicator 22 corresponds to an optical guide path D.

The indicator assembly 14 is mounted on the wiring board 31. The wiring board 31 is provided with a driving circuit for driving the indicator 22 of the indicator assembly 14, and the indicator assembly 14 is integrally mounted on one end side of the wiring board 31 at its surface side. In this way, the wiring board 31 extends along the irradiation direction of the display light L from the indicator 22 of the indicator assembly 14. Also, a connector 32 is mounted on the wiring board 31, and a connection port 32a of the connector 32 faces in a lateral direction.

The lower casing 12 is provided with a light guide frame 34 which is formed in a shape of a square tube to enclose the light guide path D, at the front surface of the indicator assembly 14. The display light L irradiated from the indicator assembly 14 is guided to the other end side of the lower casing 12 through the light guide frame 34. Also, the lower casing 12 is provided with a plurality of ghost preventing ribs 37, which are formed along a direction perpendicular to the irradiation direction, on an inner peripheral surface of the light guide frame 34 and a bottom surface ahead of the irradiation direction of the display light L rather than the light guide frame 34. The ghost preventing ribs 37 prevent formation of a virtual image due to diffused reflection of the display light L that is irradiated from the indicator assembly 14.

The flat mirror assembly 15 has a flat mirror (a reflective mirror) 41 and a bezel 42, and the flat mirror 41 is fixed to the lower casing 12 by the bezel 42. The flat mirror assembly 15 is disposed ahead of the irradiation direction of the indicator light L from the display 22 of the indicator assembly 14, and is gently inclined in the lateral direction with respect to the irradiation direction of the display light L. In this way, the flat mirror assembly 15 reflects the display light L irradiated from the indicator 22 toward the driving mirror assembly 16 at one lateral portion of the lower casing 12 by the flat mirror 41.

The driving mirror assembly 16 has a reflective mirror 51 made of an aspherical mirror, for example, a concave mirror, a holder 52, a base plate 53, and a step motor 54. The reflective mirror 51 is held by the holder 52, and the holder 52 is pivotally supported by the base plate 53 so that it pivots around a horizontal axis. The driving mirror assembly 16 is fixed to the lower casing 12 by screwing the base plate 53 to the bottom surface 12d of the lower casing 12. The step motor 54 pivots the holder 52 holding the reflective mirror 51, that is, the holder 52 is pivoted by the step motor 54, so that the direction of the reflective mirror 51 is changed.

The display light L reflected from the flat mirror 41 of the flat mirror assembly 15 is guided to the reflective mirror 51 of the driving mirror assembly 16. The reflective mirror 51 enlarges and reflects the display light L in an upward direction. In this instance, as the holder 52 is pivoted by the step motor 54 of the driving mirror assembly 16, the irradiation direction of the display light L is changed.

The casing 11 is configured by attaching the upper casing 13 to the upper surface of the lower casing 12 with screw fixing or the like, and thus the inside of the casing 11 is in a light-shielding state. The upper casing 13 has an opening 61 at a light guiding portion of the display light L which is reflected from the reflective mirror 51, and an outer glass 62 is attached to cover the opening 61.

The lower casing 12 is provided with a plurality of brackets 12a around the lower casing 12, and the head-up display device 10 is fixed to a given mounting portion in an instrument panel by screwing the bracket 12a to the instrument panel.

In the head-up display device 10 including the above configuration, the display light L irradiated from the indicator 22 configuring the indicator assembly 14 passes through the light guide path D of the lower casing 12, and is reflected from the flat mirror 41. After the display light L is enlarged and reflected by the reflective mirror 51, the display light L is emitted through the outer glass 62 in the opening 61 of the upper casing 13. Then, the display light L passes through the opening of the instrument panel, and is reflected by the windshield, so that it is guided to an eye range of the driver.

In this way, the driver can visually recognize the projected virtual image and a foreground of the vehicle to be superimposed and visually recognized through the windshield from the eye point of the vehicle.

Next, the concrete mounting structure of the flat mirror 41 to the lower casing 12 will be described.

As illustrated in FIGS. 5 and 6, the lower casing 12 is formed integrally with a support base 71 at its bottom surface 12d. The support base 71 has a base 72 formed along the bottom surface 12d of the lower casing 12, a pair of support portions 73 extending from both ends of the base 72 to the upper side of the lower casing 12 which is the upper casing 13, and a rear plate 74 formed on the rear side of the support base 71 which is opposite to the indicator 22.

The base 72 is provided at its upper surface with mirror support pieces 81 near both ends thereof. The mirror support pieces 81 are provided with resilient pieces 82 at its front sides which are the side of the indicator 22. Also, the base 72 is provided with locking portions 86 near both ends thereof.

The support portions 73 are provided with guide grooves 85 along a vertical direction of the lower casing 12.

The rear plate 74 is provided at a center portion of a lower side with a reference rib (positioning rib) 88 protruding toward a center side. Also, the rear plate 74 is provided near both sides thereof with support ribs (positioning ribs) 89 along the vertical direction of the lower casing 12.

A bezel 42 holding the flat mirror 41 is made of metal or the like, and has a frame 91. Both sides of the frame 91 are provided with an engaging plate portion 92, and the engaging plate portions 92 are provided with a resilient portion 93 at its front side which is the side of the indicator 22. Also, a lower end of the frame 91 is provided with a claw portion 94 near both sides thereof. An upper end of the frame 91 is provided with a push portion 95, which protrudes toward the rear side which is opposite to the indicator 22, along a widthwise direction.

The flat mirror 41 is formed in a rectangular shape, and the bezel 42 is disposed at the front side of the flat mirror 41. In this way, the engaging plate portions 92 of the bezel 42 are disposed at both sides of the flat mirror 41 which is the surface towards the indicator 22. Also, the push portion 95 of the bezel 42 is disposed on the upper portion of the flat mirror 41.

In order to mount the flat mirror 41 to the lower casing 12, the bezel 42 is overlapped with on the front side of the flat mirror 41, and the engaging plate portions 92 of the bezel 42 are disposed at both sides of the flat mirror 41 on its surface.

Next, both lateral edges of the support base 71 formed on the lower casing 12 are engaged with guide grooves 85 formed on the support portions 73 from the upper side which is a mounting side of the upper casing 13, and the flat mirror 41 is inserted therein, with the bezel 42 being overlapped with the flat mirror 41. In this way, both lateral edges of the flat mirror 41 and the engaging plate portions 92 of the bezel 42 are inserted in the guide grooves 85. Also, the claw portion 94 formed near both sides on the lower end of the frame 91 of the bezel 42 are locked to the locking portions 86 formed near both ends on the base 72. As a result, the flat mirror 41 is mounted to the support base 71.

The lower edge of the flat mirror 41 is put on the mirror support piece 81 of the base 72, and the push portion 95 of the bezel 42 is pressed against its upper edge. In this way, the height position of the flat mirror 41 to the lower casing 12 is positioned by the mirror support piece 81 and the push portion 95 of the bezel 42.

Both lateral portions of the lower end of the flat mirror 41 come in the rear side of the resilient pieces 82. In this way, the lower end of the flat mirror 41 is pressed toward the rear side by the resilient pieces 82. Also, the engaging plate portions 92 of the bezel 42 abut against the front-side inner surface of the guide groove 85. As a result, the flat mirror 41 is pressed toward the rear side by a biasing force from the resilient portions 93 of the engaging plate portions 92.

If the flat mirror 41 is pressed toward the rear side, the center portion of the flat mirror 41 in the widthwise direction is pressed against the reference rib 88, and both sides in the widthwise direction are pressed against the support ribs 89. In this way, the position of the flat mirror 41 in a depth direction perpendicular to its plane is positioned by the reference rib 88 and the support ribs 89.

According to the head-up display device according to this embodiment, as the flat mirror 41 is inserted in the bottom surface 12d of the lower casing 12 in the state in which both lateral edges of the flat mirror 41 are engaged with the guide grooves 85, the flat mirror 41 can be easily mounted to a given portion of the lower casing 12. Therefore, the mounting workability of the flat mirror 41 can be remarkably improved. Also, as compared to the mounting structure using a double-sided tape or the like, the flat mirror 41 is directly mounted to the lower casing 12 which becomes a reference of the position when it is positioned and fixed to the vehicle, so that positioning accuracy can be improved.

In addition, as the flat mirror 41 is pressed against the reference rib 88 and the support ribs 89 by the resilient portion 93 of the bezel 42, the flat mirror 41 can be positioned with high accuracy in the depth direction. Also, the flat mirror 41 can be positioned on the lower casing 12 in the height direction by the mirror support piece 81 of the bottom surface 12d of the lower casing 12 and the push portion 95 of the bezel 42. As a result, it is possible to suppress the displacement in the position of the flat mirror 41, and thus to suppress the display position of the virtual image, which is reflected from the flat mirror 41 and is illustrated on the windshield of the vehicle, from being displaced.

The present invention is not limited to the above-described embodiment, and a modification or an alteration are allowed. In addition, material, shape, size, number, location or the like of each component is arbitrary and not limited as long as they can attain the present invention.

The present application is based upon and claims the benefit of Japanese patent application No. 2011-274716 filed on Dec. 15, 2011, the contents of which are incorporated by reference in its entirety.

What is claimed is:

1. A head-up display device, comprising:
an indicator configured to emit a display light;
a lower casing to which the indicator is mounted;
an upper casing which is mounted to an upper portion of the lower casing;
a pair of support portions each having a first end provided on the lower casing and a second, opposite end facing the upper casing;
guide grooves which are formed on the support portions at opposite sides thereof, wherein the guide grooves respectively have insertion ports which are open at the second end of the corresponding support portions; and
a reflective mirror which is inserted into the insertion ports of the guide grooves toward a bottom surface of the lower casing while both lateral edges of the reflective mirror are engaged with the guide grooves and mounted to the lower casing, to reflect the display light emitted from the indicator and guide the reflected display light to a windshield of a vehicle.

2. The head-up display device according to claim 1, wherein the lower casing is provided with a plurality of positioning ribs at a side opposite to the indicator with respect to the reflective mirror to be mounted, a bezel is overlaid with the reflective mirror at a side of the indicator, the bezel has a resilient portion for biasing the reflective mirror toward a side opposite to the indicator, and the reflective mirror is biased by the resilient portion of the bezel, and then is pressed against the positioning ribs, so that the reflective mirror is positioned and restricted in a depth direction.

3. The head-up display device according to claim 2, wherein the plurality of positioning ribs is provided on a rear plate at a side opposite to the indicator, and the plurality of positioning ribs includes a reference rib provided at a center portion of the rear plate and a pair of support ribs provided at both sides of the rear plate.

4. The head-up display device according to claim 2, wherein a bottom surface of the lower casing is provided with a mirror support piece which abuts against a lower edge of the reflective mirror, the bezel is provided with a push portion which abuts against an upper edge of the reflective mirror, and the mirror support piece and the push portion abut against the reflective mirror, so that the reflective mirror is positioned and restricted in a height direction to the lower casing.

\* \* \* \* \*